US012479183B2

(12) United States Patent
Holka et al.

(10) Patent No.: US 12,479,183 B2
(45) Date of Patent: Nov. 25, 2025

(54) PACKAGING CONTAINER AND A METHOD OF PRODUCING SUCH A PACKAGING CONTAINER

(71) Applicant: GPI Systems AB, Lund (SE)

(72) Inventors: Simon Holka, Staffanstorp (SE); Per Hagelqvist, Lund (SE); Anna Naukkarinen, Helsingborg (SE); My Hommerberg, Malmö (SE)

(73) Assignee: Graphic Packaging International, LLC, Atlanta, GA (US)

( * ) Notice: Subject to any disclaimer, the term of this patent is extended or adjusted under 35 U.S.C. 154(b) by 165 days.

(21) Appl. No.: 18/230,195

(22) Filed: Aug. 4, 2023

(65) Prior Publication Data

US 2024/0042722 A1 Feb. 8, 2024

(30) Foreign Application Priority Data

Aug. 5, 2022 (SE) .................................... 2250951-7

(51) Int. Cl.
*B31B 70/00* (2017.01)
*B31B 70/74* (2017.01)

(52) U.S. Cl.
CPC ............ *B31B 70/008* (2017.08); *B31B 70/74* (2017.08); *B31B 2241/00* (2013.01)

(58) Field of Classification Search
CPC .... B65B 1/02; B65B 1/04; B65B 1/06; B65B 7/28; B65B 43/10; B65B 51/10; B65D 3/26; B65D 3/02; B65D 3/14; B65D 3/30; B65D 43/02
USPC ............................................................ 493/52
See application file for complete search history.

(56) References Cited

U.S. PATENT DOCUMENTS

| | | | | |
|---|---|---|---|---|
| 4,210,618 | A | 7/1980 | Piltz | |
| 9,834,347 | B2 | 12/2017 | Larsson et al. | |
| 10,370,158 | B2 | 8/2019 | Herlin et al. | |
| 10,730,660 | B2 | 8/2020 | Herlin et al. | |
| 10,736,468 | B2 | 8/2020 | Herlin et al. | |
| 10,787,280 | B2 | 9/2020 | Herlin et al. | |
| 11,111,062 | B2 | 9/2021 | Herlin et al. | |
| 11,186,416 | B2 | 11/2021 | Sunning et al. | |
| 11,292,625 | B2 | 4/2022 | Holka et al. | |
| 11,697,528 | B2 | 7/2023 | Dahlin et al. | |
| 2017/0334614 | A1 | 11/2017 | Herlin et al. | |
| 2018/0016038 | A1* | 1/2018 | Herlin | B65D 3/12 |

(Continued)

FOREIGN PATENT DOCUMENTS

| | | | |
|---|---|---|---|
| EP | 2 662 302 | B1 | 9/2015 |
| EP | 3 360 617 | B1 | 3/2022 |
| EP | 4 072 951 | | 10/2022 |

(Continued)

OTHER PUBLICATIONS

International Search Report and Written Opinion for PCT/US2023/029449 dated Nov. 21, 2023.

*Primary Examiner* — Jacob A Smith
(74) *Attorney, Agent, or Firm* — Andrew N. Claerbout; FisherBroyles, LLC

(57) ABSTRACT

A paperboard packaging container for bulk solids and a method of forming a paperboard packaging container for bulk solids. The container having a container body closed at one end by a lid formed by sequential insertion and attachment of a first paperboard insert and a second paperboard insert.

25 Claims, 6 Drawing Sheets

(56) References Cited

U.S. PATENT DOCUMENTS

| | | | | |
|---|---|---|---|---|
| 2019/0127107 | A1* | 5/2019 | Herlin | B65B 1/02 |
| 2019/0256230 | A1* | 8/2019 | Holka | B65B 1/02 |

FOREIGN PATENT DOCUMENTS

| | | | |
|---|---|---|---|
| EP | 4 296 192 | A1 | 12/2023 |
| WO | WO 2018/009130 | A1 | 1/2018 |
| WO | WO 2021/002797 | A1 | 1/2021 |
| WO | WO 2021/118441 | A1 | 6/2021 |

* cited by examiner

PACKAGING CONTAINER AND A METHOD OF PRODUCING SUCH A PACKAGING CONTAINER

CROSS-REFERENCE TO RELATED APPLICATION

The present application claims the benefit of Swedish Patent Application No. 2250951-7, filed on Aug. 5, 2022.

INCORPORATION BY REFERENCE

The disclosure of Swedish Patent Application No. 2250951-7, filed on Aug. 5, 2022, is hereby incorporated by reference for all purposes as if presented herein in its entirety.

TECHNICAL FIELD

The present disclosure pertains to a method of producing a paperboard packaging container for bulk solids and a paperboard container for bulk solids.

BACKGROUND OF THE DISCLOSURE

In the area of disposable containers for products such as infant formula, tobacco, detergents, etc. there is an ongoing need of diminishing the carbon footprint of such products, by minimizing the resource use for the disposable containers as well as making the containers recyclable. The disposable containers referred to herein are composite containers having a tubular body which is made from a laminate sheet material comprising a carton layer, i.e., a layer made predominantly from cellulosic fibers. The upper and lower end edge of the container may include a plastic rim connected to the edges of the packaging container. This provides the packaging containers with a pleasant and neat appearance and the container top or bottom may also be more wear resistant. The bottom of the container may alternatively be made from a folded-in end portion of the tubular body or may be a bottom insert/disc which is attached to the tubular body at the bottom end. The appearance may however for such packaging containers be somewhat less attractive and less wear resistant at the bottom end of the packaging container.

Accordingly, an object of the present disclosure is to provide an improved packaging container offering better stability and easier opening of the lid of the container. Another object is to provide a method of manufacturing such a container.

SUMMARY OF THE DISCLOSURE

In one aspect, the disclosure is generally directed to a method of forming a paperboard packaging container for bulk solids. The method comprises obtaining a body blank having a first side edge and a second side edge, the body blank being made of a laminate sheet material comprising a carton substrate layer. The method comprises forming a container body from the body blank, the container body defines an inner compartment, the container body comprises a container body wall having an inner surface facing the inner compartment, an outer surface facing away from the inner compartment, and a weakened portion extending along at least a portion of the circumference of the container body, the container body comprises a first end with a first end opening and a second end opposite the first end having a second end opening. The method comprises closing the first end opening by pressing a first paperboard insert into the first end opening to a first predetermined position relative to the container body and forming an external recess, the first paperboard insert comprising a first central portion covering the first end opening and a first peripheral flange portion, at the first predetermined position of the first paperboard insert. The method comprises attaching the first peripheral flange portion of the first paperboard insert to the container body wall at a first attachment portion of the container body, the weakened portion in the container body wall is between the first attachment portion and the second end of the container body. The method comprises pressing a second paperboard insert into the external recess through the first end opening to a second predetermined position relative to the container body, the second paperboard insert comprising a second central portion covering the first end opening and a second peripheral flange portion. The method comprises attaching the second peripheral flange portion of the second paperboard insert to the container body wall.

According to another aspect, the disclosure is directed to a paperboard packaging container for bulk solids. The container comprises a container body defining an inner compartment. The container body comprises a container body wall made of a laminate sheet material comprising a carton substrate layer. The container body comprises a first end with a first end opening and a second end opposite the first end having a second end opening. The container body wall has an inner surface facing the inner compartment and an outer surface facing away from the inner compartment. A first paperboard insert closes the first end opening, the first paperboard insert comprising a first central portion covering the first end opening and a first peripheral flange portion. The first paperboard insert is located in the container body and forms an external recess. The first peripheral flange portion is attached to the inner surface of the container body wall at a first attachment portion of the container body. The container body being has a weakened portion extending along at least a portion of the circumference of the container body. The weakened portion is between the first attachment portion and the second end of the container body. The packaging container further comprises a second paperboard insert positioned in the external recess and covering the first end opening. The second paperboard insert comprises a second central portion and a second peripheral flange portion attached to the container body wall.

According to one aspect, the object above is achieved by a method of forming a paperboard packaging container according to the subject matter of the claims, in the following description and in the drawings. In one embodiment, the method is a method of forming a paperboard packaging container from a body blank. The method comprises a step a) of obtaining a body blank having a first side edge and a second side edge, said body blank being made of a laminate sheet material comprising a carton substrate layer.

Also, the method comprises a step b) of forming a tubular container body from the body blank.

Further, the method comprises a step c) of sealing together the first side edge and the second side edge, wherein the tubular container body defines an inner compartment, wherein the container body comprises a container body wall having an inner surface facing the inner compartment and an outer surface facing away from the inner compartment, and wherein the container body comprises a first end with a first end opening and an opposite second end with a second end opening.

Also, the method comprises a step d) of closing the first end opening by pressing a first paperboard insert into the first end opening to a first predetermined position relative to the container body, the first paperboard insert comprising a first central portion covering the first end opening, and comprising a first peripheral flange portion directed away from the first central portion towards the first end opening of the container such that an external recess of the packaging container is formed, Further, the method comprises a step e) of attaching the first peripheral flange portion of the first paperboard insert to the container body wall.

Also, the method comprises a step f) of pressing a second paperboard insert into the external recess through the first end opening to a second predetermined position relative to the container body, the second paperboard insert comprising a second central portion covering the first end opening, and comprising a second peripheral flange portion directed away from the second central portion towards the first end opening of the container body.

Further, the method comprises a step g) of attaching the second peripheral flange portion of the second paperboard insert to the container body wall.

By attaching a first and second paperboard insert to the container body wall, a double-wall lid structure is formed by the first paperboard insert and the second paperboard insert. The lid structure is more robust than a single-wall lid structure formed when using only one paperboard insert and thus enables stability of the lid also for packaging containers with larger cross-sectional area and produced with weaker material. Increased stability of the lid also enables easier handling of the lid at separation of the lid from the rest of the packaging container with reduced risk of breaking/deforming the lid.

The method may further comprise a step h) of deforming the second central portion of the second paperboard insert prior to attaching the second peripheral flange portion to the container body wall, such that a recessed portion of the second paperboard insert is formed adjacent the second peripheral flange, said recessed portion being shaped such that a distance between the second central portion of the second paperboard insert and the first central portion of the first paperboard insert is reduced at the recessed portion.

By deforming the second central portion prior to attaching the second peripheral flange portion to the container body wall, the material of the paperboard insert is free to move during deformation, such that material of the paperboard blank used to form the paperboard insert is able to move from the peripheral portion of a second paperboard blank used for forming of the second paperboard insert, thereby mitigating stretching of the paperboard material during deformation of the second central portion of the second paperboard insert.

Step f) may be performed by forcing the second paperboard insert into the external recess using a footprint surface of a press tool, said footprint surface having a shape and size adapted to the shape and size of the first end opening of the container body, and having a protrusion for forming the recessed portion of the second paperboard insert.

Step f) may comprises positioning a guide plate adjacent the first end opening of the container body such that a through cavity of the guide plate is aligned with the first end opening, said through cavity having a shape and size corresponding to the shape and size of the first end opening of the container body, wherein the second paperboard insert is guided into the external recess through the through cavity of the guide plate at pressing of the second paperboard insert into the external recess, wherein the second peripheral flange portion is bent between the guide plate and the press tool.

The use of such a guide plate, protects the first end of the container body such that deformation of the paperboard blank occurs mainly as a result of forces acting on the paperboard blank by the guide plate and the press tool, rather than between the container body wall and the press tool.

The through cavity of the guide plate may have a recessed portion extending the through cavity laterally with respect to an insertion direction along which the second paperboard insert is inserted into the external recess, said recessed portion of the through cavity being positioned adjacent where the protrusion of the footprint surface passes through said through cavity.

The recesses portion reduces the area/edge length of the through cavity of the guide plate on which the blank slides at deformation between the press tool and the guide plate, thus enabling increased local stress on portions of the paperboard blank such that the paperboard blank folds at intended locations as the second peripheral flange portion is folded to point away from the second central portion of the second paperboard insert.

According to a second aspect, the object above is also achieved by a paperboard packaging container according to the claims, in the following description and in the drawings. The packaging container is suitable for bulk solids and the container comprises a tubular container body defining an inner compartment. The container body comprises a container body wall made of a laminate sheet material comprising a carton substrate layer, and comprises a first end with a first end opening and an opposite second end with a second end opening. The container body wall has an inner surface facing the inner compartment in the packaging container and an outer surface facing away from the inner compartment. The first end opening is closed by a first paperboard insert comprising a first central portion covering the first end opening. The first paperboard insert further comprises a first peripheral flange portion directed away from the first central portion towards the first end opening of the packaging container such that an external recess of the packaging container is formed. The first peripheral flange portion is attached to the inner surface of the container body wall at a first attachment portion of the container body. Also, the container body has a weakened portion extending along at least a portion of the circumference of the container body, the weakened portion is between the first attachment portion and the second end of the container body. The packaging container further comprises a second paperboard insert positioned in the external recess and covering the first end opening. The second paperboard insert comprises a second central portion and a second peripheral flange portion directed away from the second central portion towards the first end opening of the packaging container. The second peripheral flange portion is attached to the inner surface of the container body wall or can alternatively be attached to the first peripheral flange of the first paperboard insert.

The first paperboard insert and the second paperboard insert both attach to the container body wall. At opening of the packaging container, a user grabs the first end of the container body, typically by grabbing the second peripheral flange portion of the second paperboard insert, and pulling such that the container body wall separates at the weakened portion. Since the weakened portion is between the first attachment portion and the second end of the container body, the first paperboard insert and the second paperboard insert together form a lid comprising the torn off portion or upper portion of the container body wall. The combination of the two paperboard inserts improves rigidity of the lid and makes the lid easier to handle during and after separation of the lid from the rest of the container body.

The second central portion of the second paperboard insert may comprise a recessed portion adjacent the container body wall.

The recess adjacent the container body wall makes it easier for the user to grab hold of the lid when tearing it off the rest of the container body by increasing the surface area available to be gripped by the user. The recess also provides a visual indication for the user where to grab, thus making it even easier to remove the lid, since pulling the lid off the rest of the container will be more difficult if pulled at an arbitrary location.

The second paperboard insert may be formed from a paperboard blank, wherein said paperboard blank comprises a central portion having a shape and size corresponding to the shape and size of the first end opening of the container body, and a peripheral portion surrounding the central portion.

As shown in FIG. 3, the peripheral portion of the paperboard blank may be enlarged adjacent a portion of the paperboard blank where the recessed portion is formed.

By enlarging the paperboard blank adjacent where the recessed portion is formed, extra material is available to form the recessed portion without reducing the amount of material available for forming the second peripheral flange portion. This enables attachment of the second peripheral flange portion to the container using welding or adhesive bond extending around the circumference of the first end opening of the packaging container in a planar fashion.

The second central portion of the second paperboard insert may comprise a grip opening which may be covered by a removable cover.

The grip opening provides an alternative to the recess discussed above. The grip opening enables a user to grab the lid through the grip opening, thus reaching a larger surface area of the lid to grab hold of. The grip opening may be covered by a separate lid member or membrane, or may be covered by a portion made from the same paperboard blank as the second paperboard insert by provision of a scoring, perforation or similar extending at least partly around the circumference of the grip opening such that the user gains access to the opening by forcing the cover into the space between the first paperboard insert and the second paperboard insert, or by lifting or tearing off the cover.

As shown in FIG. 5, the removable cover may be a portion of the second central portion integrally formed with the second paperboard insert and at least partly surrounded by a perforation of the second central portion.

The cover may be hingedly connected to the second paperboard insert by a hinge. By joining the cover by a hinge, the cover can easily be lifted and lowered for opening and closing respectively, of the grip opening of the second paperboard insert. This allows for an intermediate space between the first paperboard insert and the second paperboard insert to be used for storage purposes and allows easy repeated access to objects stored in the intermediate space. For example, a spoon can be stored in the intermediate space and replaced there after use of the spoon.

BRIEF DESCRIPTION OF THE DRAWINGS

The present disclosure will be further explained hereinafter by means of non-limiting examples and with reference to the appended drawings.

Like reference number denote similar features throughout the figures. Reference numbers may be omitted in some figures for better visibility, in which case reference is made to the other figures.

DETAILED DESCRIPTION

It is to be understood that the drawings are schematic and that individual components, such as layers of materials are not necessarily drawn to scale. The steps in the method of forming a packaging container 1, and the packaging container 1 shown in the figures, are provided as examples only and should not be considered limiting to the present disclosure.

First, an exemplary embodiment of the packaging container 1 will be described with reference to the appended figures. Thereafter the method of manufacturing the packaging container 1 will be described.

Figure 2:
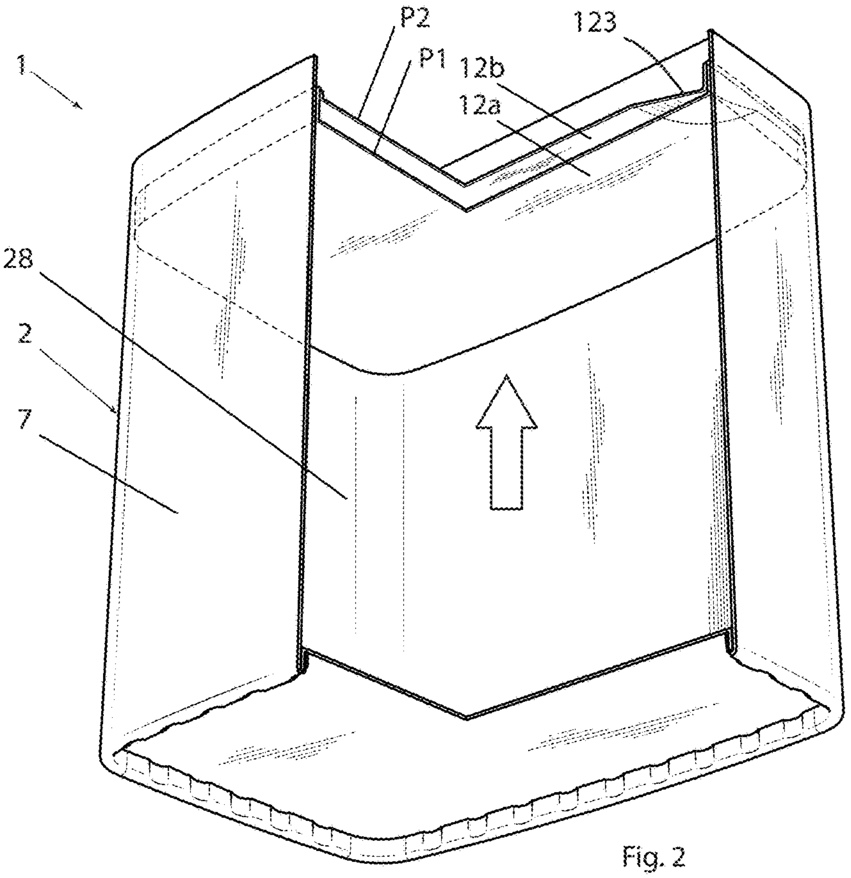
FIG. 2 shows a perspective view of a first embodiment of a packaging container of the present disclosure with a portion cut away to show the cross section of a lid of the packaging container.
Figure 8:
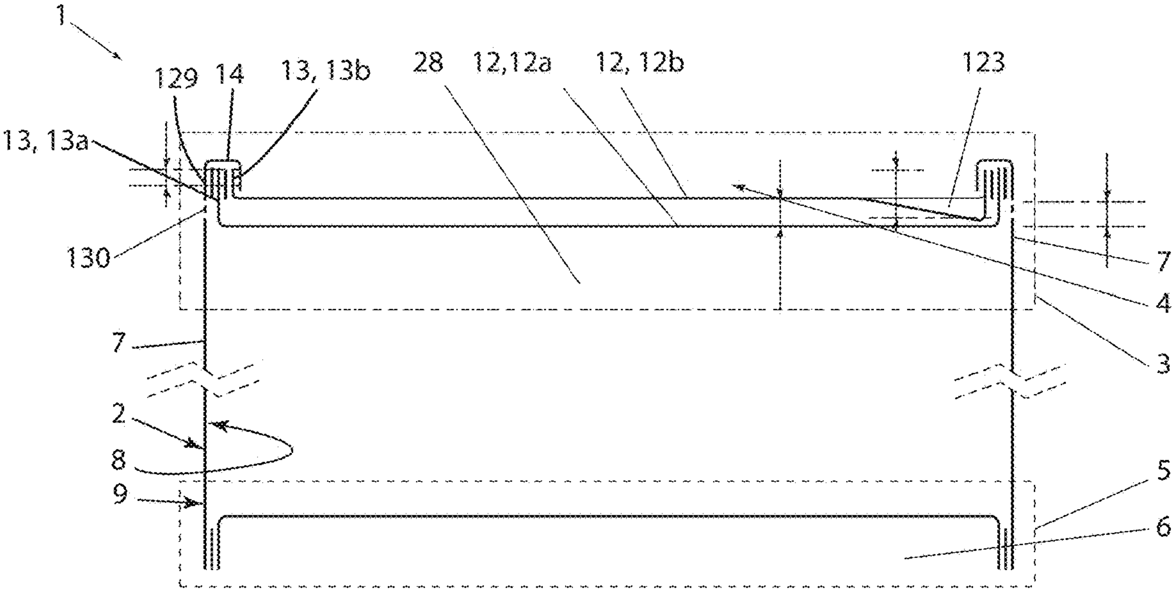
FIG. 8 shows a schematic cross-sectional view of a second embodiment of a packaging container of the present disclosure.

As shown in FIGS. 2 and 8, the packing container 1 comprises a tubular container body 2 defining an inner compartment 28. The container body 2 comprises a container body wall 7 made of a laminate sheet material comprising a carton substrate layer, and comprises a first end 3 with a first end opening 4 and an opposite second end 5 with a second end opening 6. The container body wall 7 has an inner surface 8 facing the inner compartment 28 in the packaging container 1 and an outer surface 9 facing away from the inner compartment 28. The first end opening 4 is closed by a first paperboard insert 12*a* comprising a first central portion 121*a* covering the first end opening 4. The first paperboard insert 12*a* further comprises a first peripheral flange portion 13*a* directed away from the first central portion 121*a* towards the first end opening 4 of the packaging container 1 such that an external recess 122 of the packaging container 1 is formed. The first peripheral flange portion 13*a* is attached to the inner surface 8 of the container body wall 7 at a first attachment portion 129 of the container body 2.

Figure 14:
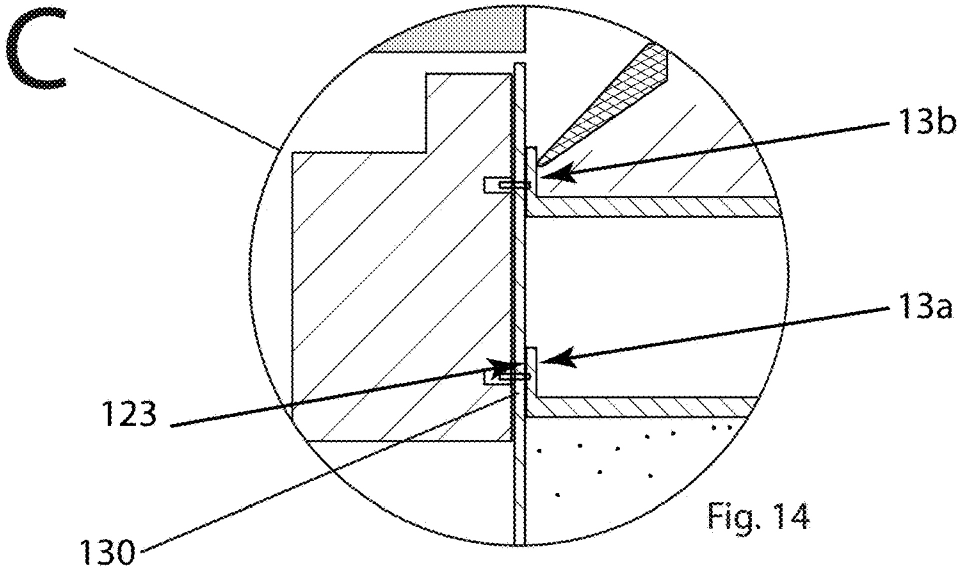
FIG. 14 show enlarged region C of FIG. 13, pointing out the position of the attachment portion around which the first peripheral flange is attached to the container body wall. Also shown is a weakened portion of the container body, positioned between the attachment portion and the bottom end (second end) of the packaging container. Such positioning of the weakened portion allows for separation of the double-wall lid from the rest of the container body by tearing the lid off the rest of the container body at said weakened portion.

Also, as for example shown in the enlarged portion C of FIG. 14, the container body 2 has a weakened portion 130 extending along at least a portion of the circumference of the container body 2, the weakened portion 130 is between the first attachment portion 129 and the second end 5 of the container body 2. In this embodiment, the weakened portion 130 comprises a perforation extending around the full circumference of the packaging container 1, but in other embodiments, any other suitable type of weakening may alternatively be used instead, such as a crease line or a tear-off tape. In this embodiment, the perforation extends only partially through the container body wall 7, such that a sealing layer on the inside of the paperboard is not perforated.

As shown in FIG. 14, the first peripheral flange portion 13*a* preferably extends past the weakened portion 130, such that a lid comprising said first paperboard insert 12*a* can be guided by the peripheral flange portion into the container body 2 at closing of the lid of the packaging container 1 (once the packaging container 1 has been opened by tearing off the lid at the weakened portion 130 of the container body 2).

Figure 6:
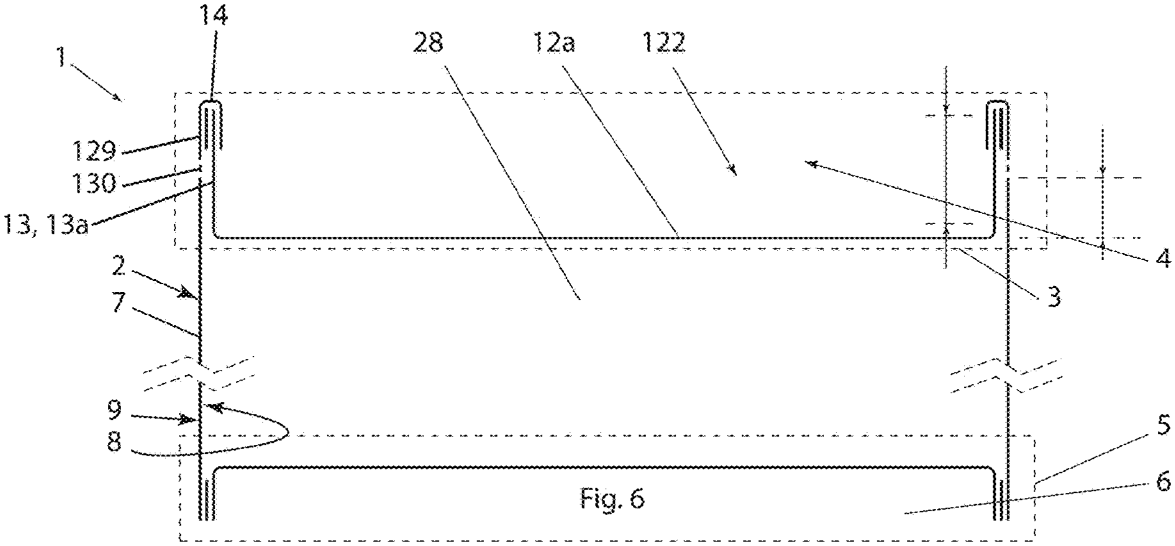
FIG. 6 shows a schematic cross-sectional view of a prior art packaging container.
Figure 7:
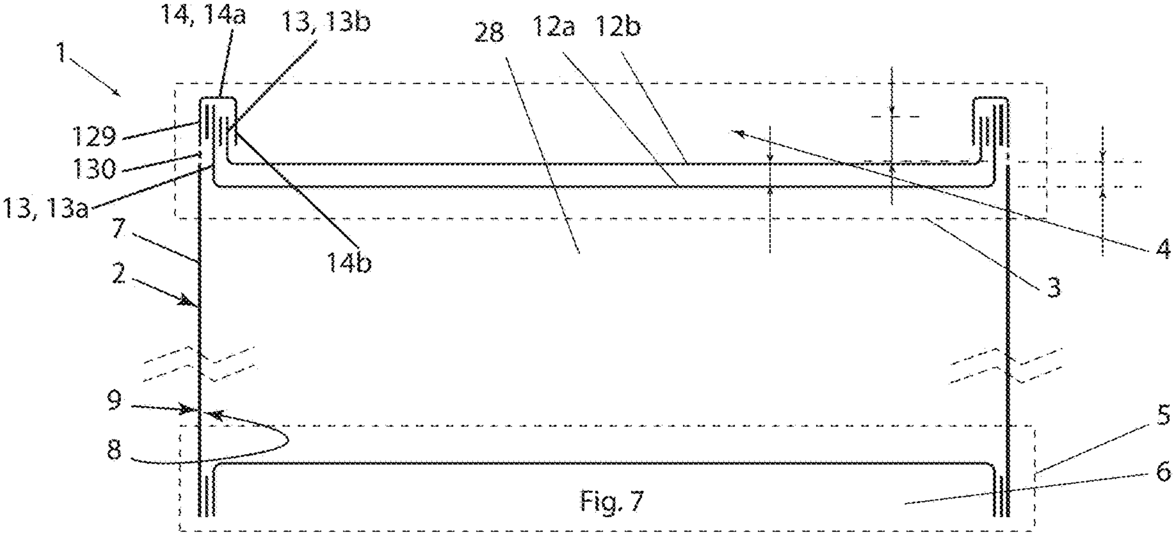
FIG. 7 shows a schematic cross-sectional view of a first embodiment of a packaging container of the present disclosure.

The above-mentioned structure of the container body 2 is common of all embodiments of the packaging container 1 of the present disclosure and corresponds to container body 2 shown in FIG. 6.

As shown in FIGS. 2 and 8, the packaging container 1 further comprises a second paperboard insert 12*b* positioned in the external recess 122 and covering the first end opening 4. The second paperboard insert 12*b* comprises a second central portion 121*b* and a second peripheral flange portion 13*b* directed away from the second central portion 121*b* towards the first end opening 4 of the packaging container 1. The second peripheral flange portion 13*b* is attached to the inner surface 8 of the container body wall 7. Alternatively, the second peripheral flange 13*b* could be attached to the first peripheral flange 13*a* of the first paperboard insert 12*a* without departing from the scope of the disclosure.

In the illustrated embodiment, the first paperboard insert 12*a* and the second paperboard insert 12*b* both attach to the container body wall 7. At opening of the packaging container 1, a user grabs the first end 3 of the container body 2, typically by grabbing the second peripheral flange portion 13*b* of the second paperboard insert 12*b*, and pulling such that the container body wall 7 separates at the weakened portion 130. Since the weakened portion 130 is between the first attachment portion 129 and the second end 5 of the container body 2, the first paperboard insert 12*a* and the second paperboard insert 12*b* together form a lid comprising the torn off portion (e.g., upper portion) of the container body wall 7 that separates at the weakened portion. The combination of the two paperboard inserts 12*a*, 12*b* improves rigidity of the lid and makes the lid easier to handle during and after separation of the lid from the rest of the container body 2.

As shown in FIGS. 2 and 8, the second central portion 121*b* of the second paperboard insert 12*b* comprises a recessed portion 123 adjacent the container body wall 7. In other embodiments, more than one such recessed portion 123 may be provided.

The recessed portion 123 adjacent the container body wall 7 makes it easier for the user to grab hold of the lid when tearing it off the rest of the container body 2 by increasing the surface area available to be gripped by the user. The recess also provides a visual indication for the user where to grab, thus making it even easier to remove the lid, since pulling the lid off the rest of the container will be more difficult if pulled at an arbitrary location.

Figure 3:
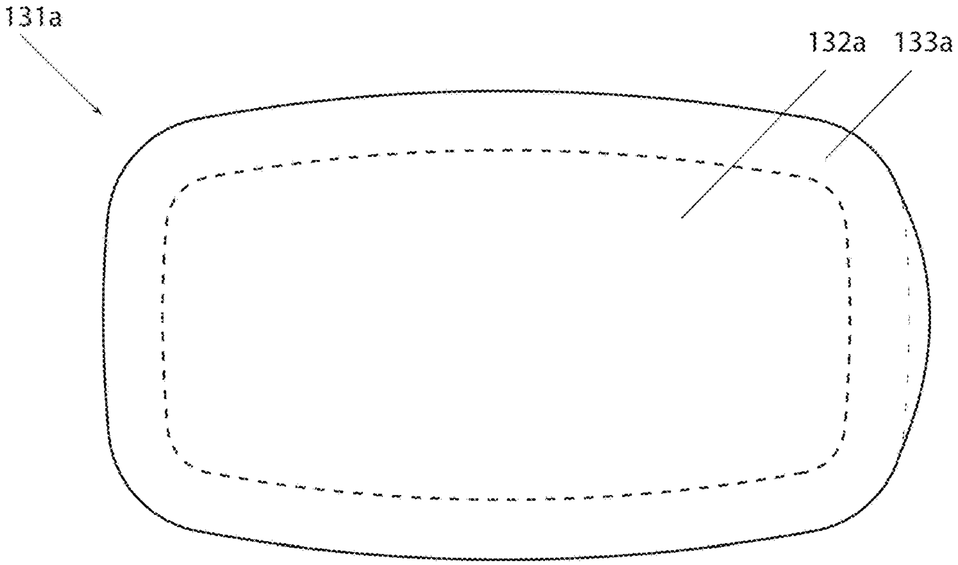
FIG. 3 shows a top view of a paperboard blank used to form a second paperboard insert for the lid of the packaging container shown in FIG. 2.

The second paperboard insert 12*b* is formed from a paperboard blank 131*a*, shown in FIG. 3. The paperboard blank 131*a* comprises a central portion 132*a* having a shape and size corresponding to the shape and size of the first end opening 4 of the container body 2. The central portion is indicated by a dashed line in FIG. 3. The second paperboard insert 12*b* also comprises a peripheral portion 133*a* surrounding the central portion 132*a*. The peripheral portion 133*a* of the paperboard blank 131*a* is enlarged adjacent a portion of the paperboard blank where the recessed portion 123 is formed.

By enlarging the paperboard blank 131*a* adjacent where the recessed portion is formed, extra material is available to form the recess without reducing the amount of material available for forming the second peripheral flange portion. This also enables attachment of the second peripheral flange portion to the container using a weld or adhesive bond extending around the circumference of the first end opening 4 of the packaging container 1 in a planar fashion.

Figure 4:
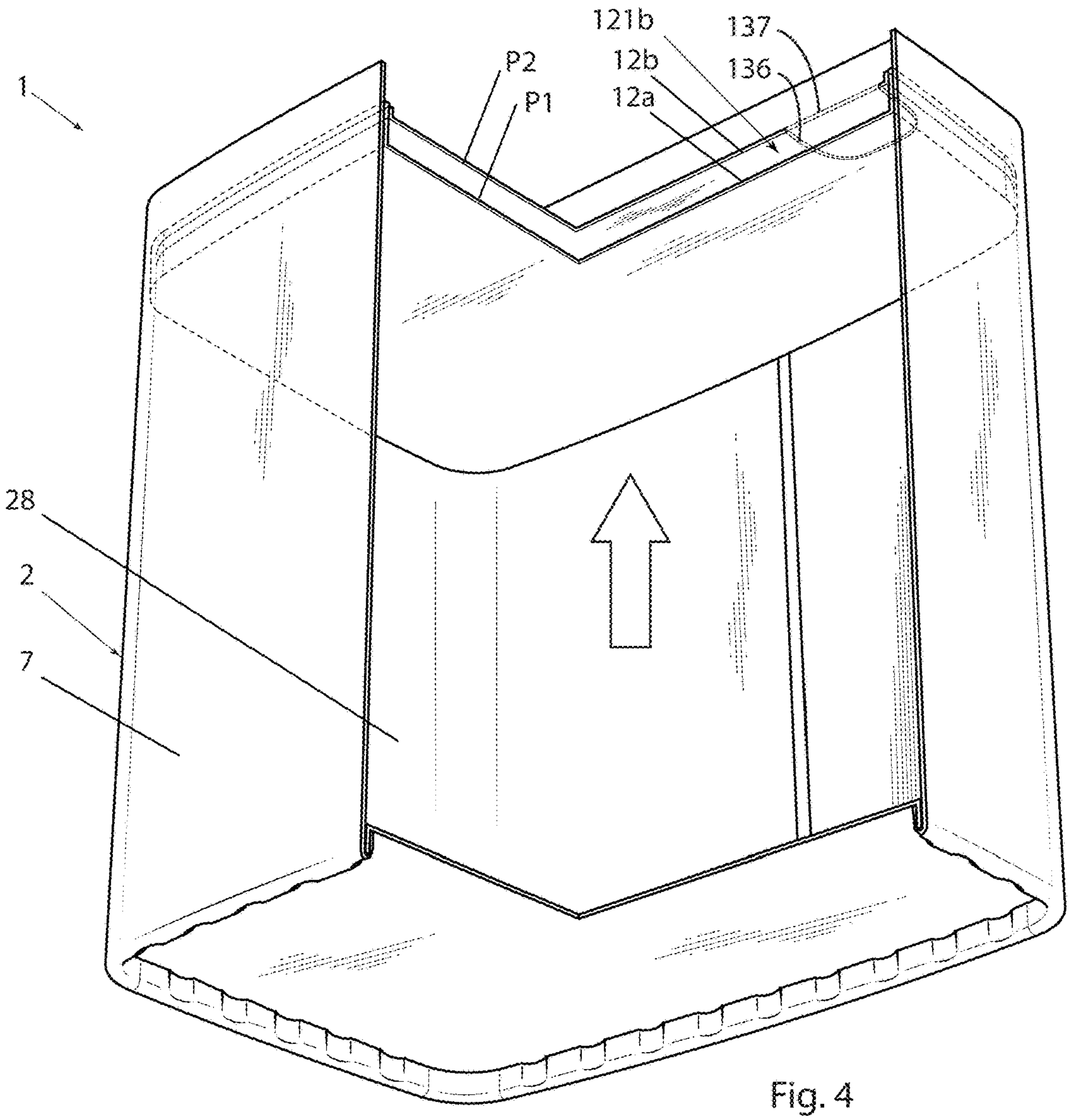
FIG. 4 shows a perspective view of a second embodiment of a packaging container of the present disclosure with a portion cut away to show the cross section of a lid of the packaging container.
Figure 5:
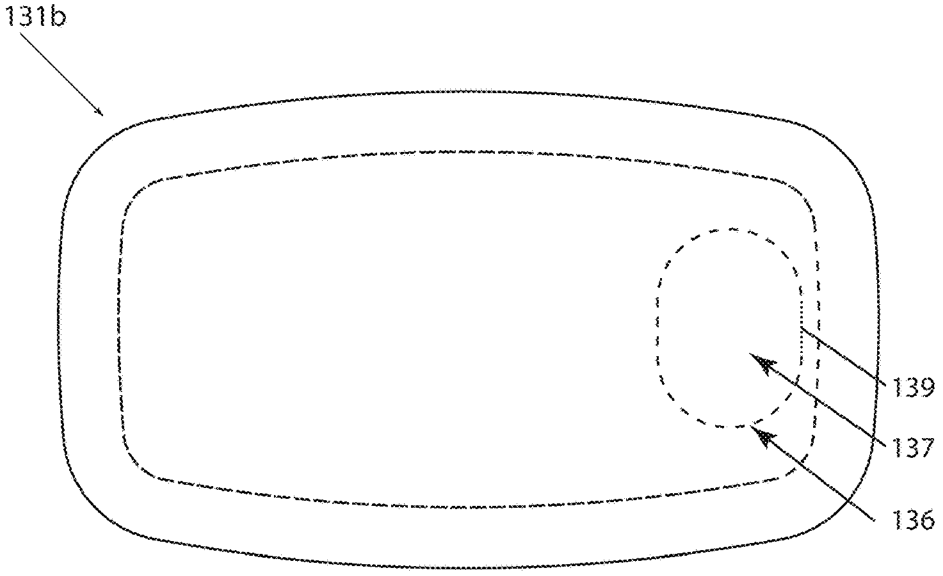
FIG. 5 shows a top view of a paperboard blank used to form a second paperboard insert for the lid of the packaging container shown in FIG. 4.

As indicated above, the second central portion 121*b* of the second paperboard insert 12*b* may in other embodiments alternatively comprise a grip opening 136 rather than a recessed portion 123. The grip opening 136 may be covered by a removable cover 137 as shown in FIGS. 4 and 5.

The grip opening 136 provides an alternative to the recessed portion 123 discussed above. The grip opening 136 enables a user to grab the lid of the packaging container 1 through the grip opening 136, thus reaching a larger surface area of the lid to grab hold of. The grip opening 136 may be covered by a separate lid member or membrane, or may be covered by a portion of material made from the same paperboard blank as the second paperboard insert 12*b* by provision of a scoring, perforation or similar extending at least partly around the circumference of the opening such that the user gains access to the opening by forcing the cover 137 into the space between the first paperboard insert 12*a* and the second paperboard insert 12*b*, or by lifting or tearing off the cover 137.

The movable/removable cover 137 may be a portion of the second central portion 121*b* integrally formed with the second paperboard insert 12*b* and at least partly surrounded by a perforation of the second central portion 121*b*.

The cover 137 may be hingedly connected to the second paperboard insert 12*b* by a hinge 139. By joining the cover 137 by the hinge 139, the cover can easily be lifted and lowered for opening and closing respectively, of the grip opening 136 of the second paperboard insert 12*b*. This allows for an intermediate space between the first paperboard insert 12*a* and the second paperboard insert 12*b* to be used for storage purposes and allows easy repeated access to objects stored in the intermediate space. For example, a spoon can be stored in the intermediate space to be easily accessed and replaced after use. The hinge 139 is typically a non-perforated portion of the second paperboard insert 12*b*, but may in other embodiments be a piece of resilient material, such as a sheet material, attached to the cover 137 and to the second paperboard insert 12*b* by adhesive or by welding.

Although the packaging container 1 may be produced using any suitable method, one exemplary method of producing the packaging container 1 will be described below with reference to the appended drawings.

Figure 1:
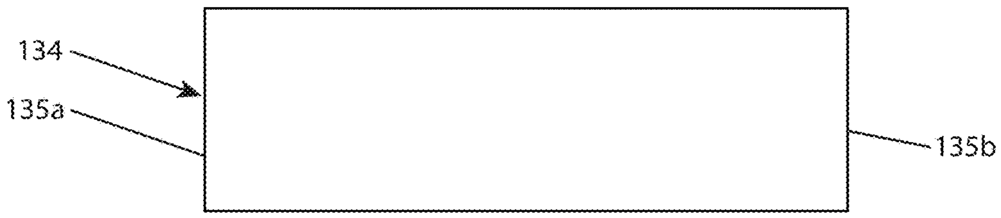
FIG. 1 shows a paperboard blank used to form a container body.

The method comprises a step a) of obtaining a body blank 134 having a first side edge 135*a* and a second side edge 135*b*, said body blank 134 being made of a laminate sheet material comprising a carton substrate layer. Such a body blank 134 is schematically shown in FIG. 1. The method also comprises a step b) of forming a tubular container body 2 from the body blank 134, including a step c) of sealing together the first side edge 135*a* and the second side edge 135*b*. The tubular container body 2 defines an inner compartment 28. Also, the container body 2 comprises a container body wall 7 having an inner surface 8 facing the inner compartment 28 and an outer surface 9 facing away from the inner compartment 28. The container body 2 comprises a first end 3 with a first end opening 4 and an opposite second end 5 with a second end opening 6.

Figure 9:
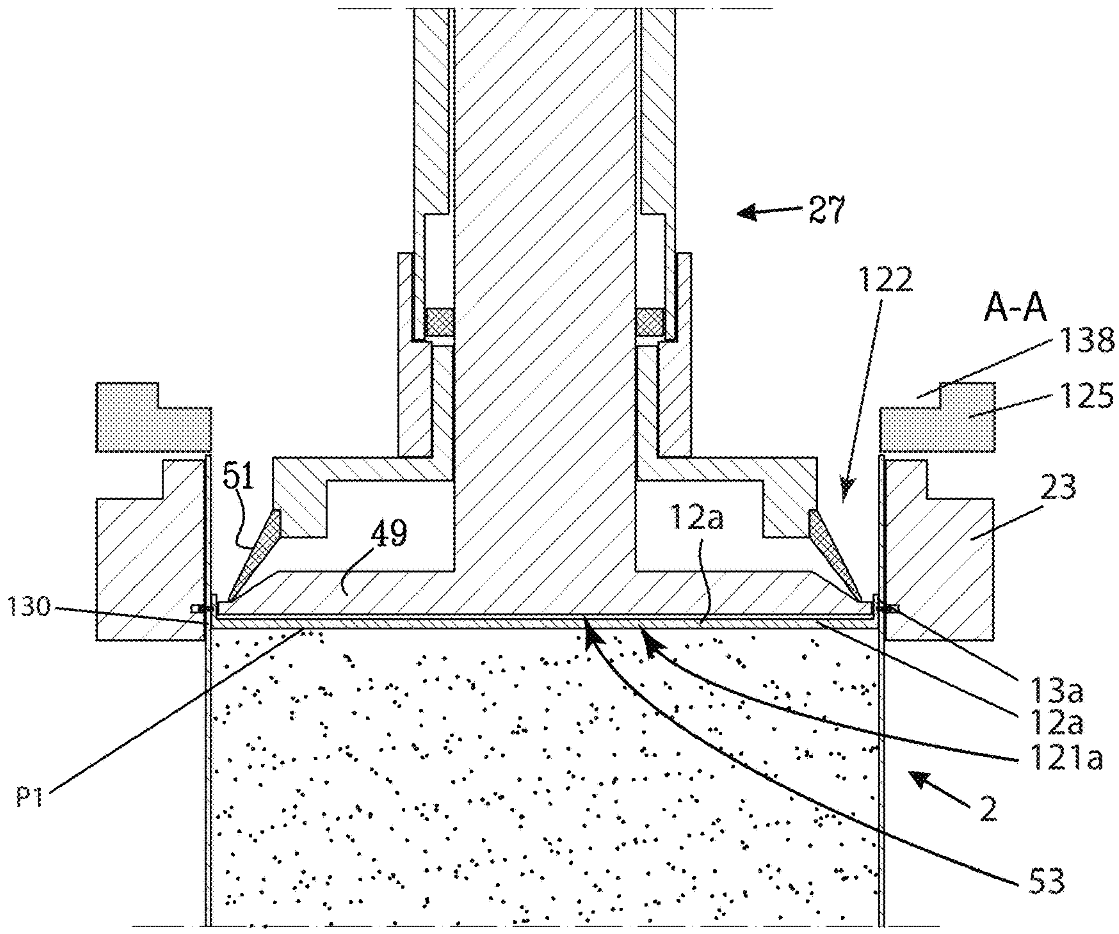
FIG. 9 shows a schematic cross-sectional view of a first paperboard insert being pressed into a packaging container of the present disclosure.

As shown in FIG. 9, the method further comprises a step d) of closing the first end opening 4 by pressing a first paperboard insert 12*a* into the first end opening 4 to a first predetermined position P1 relative to the container body 2, the first paperboard insert 12*a* comprising a first central portion 121*a* covering the first end opening 4, and comprising a first peripheral flange portion 13*a* directed away from the first central portion 121*a* towards the first end opening 4 of the container 1 such that an external recess 122 of the packaging container 1 is formed. As shown in FIG. 9, the dots representing contents of the inner compartment 28 of the packaging container 1. The contents may alternatively be filled into the container body 2 from the bottom/second end 5 of the container body after one of or both of the paperboard inserts 12*a*, 12*b* have been inserted into the container body.

The method further comprises a step e) of attaching the first peripheral flange portion 13*a* of the first paperboard insert 12*a* to the container body wall 7. For example, a suitable type of welding may be used for said attaching.

Also, the method comprises a step f) of pressing a second paperboard insert 12*b* into the external recess 122 through the first end opening 4 to a second predetermined position P2 relative to the container body 2, the second paperboard insert 12*b* comprising a second central portion 121*b* covering the first end opening 4, and comprising a second peripheral flange portion 13*b* directed away from the second central portion 121*b* towards the first end opening 4 of the container body 2. The second predetermined position P2 is above the first predetermined position P1 in the container body 2.

Further, the method comprises a step g) of attaching the second peripheral flange portion 13*b* of the second paperboard insert 12*b* to the container body wall 7. For example, a suitable type of welding may be used for said attaching.

By additionally pressing a second paperboard insert into the external recess and attaching it to the container body wall, a double-wall lid structure is formed by the first paperboard insert 12*a* and the second paperboard insert 12*b*. The lid structure is more robust than the single-wall prior art lid structures formed when using only one paperboard insert 12*a*.

The method may further comprise a step h) of deforming the second central portion 121*b* of the second paperboard insert 12*b* prior to attaching the second peripheral flange portion 13*b* to the container body wall 7, such that a recessed portion 123 of the second paperboard insert 12*b* is formed adjacent the second peripheral flange 13*b*, the recessed portion 123 being shaped such that a distance D between the second central portion 121*b* of the second paperboard insert 12*b* and the first central portion 121*a* of the first paperboard insert 12*a* is reduced at the recessed portion 123.

By deforming the second central portion prior to attaching the second peripheral flange portion to the container body wall, the material of the paperboard insert is free to move during deformation, such that material of a paperboard blank used to form the second paperboard insert 12*b* is able to move from the peripheral portion of a second paperboard blank used for forming of the second paperboard insert 12*b*, thereby mitigating stretching of the paperboard material during deformation of the second central portion of the second paperboard insert 12*b*.

Figure 11:
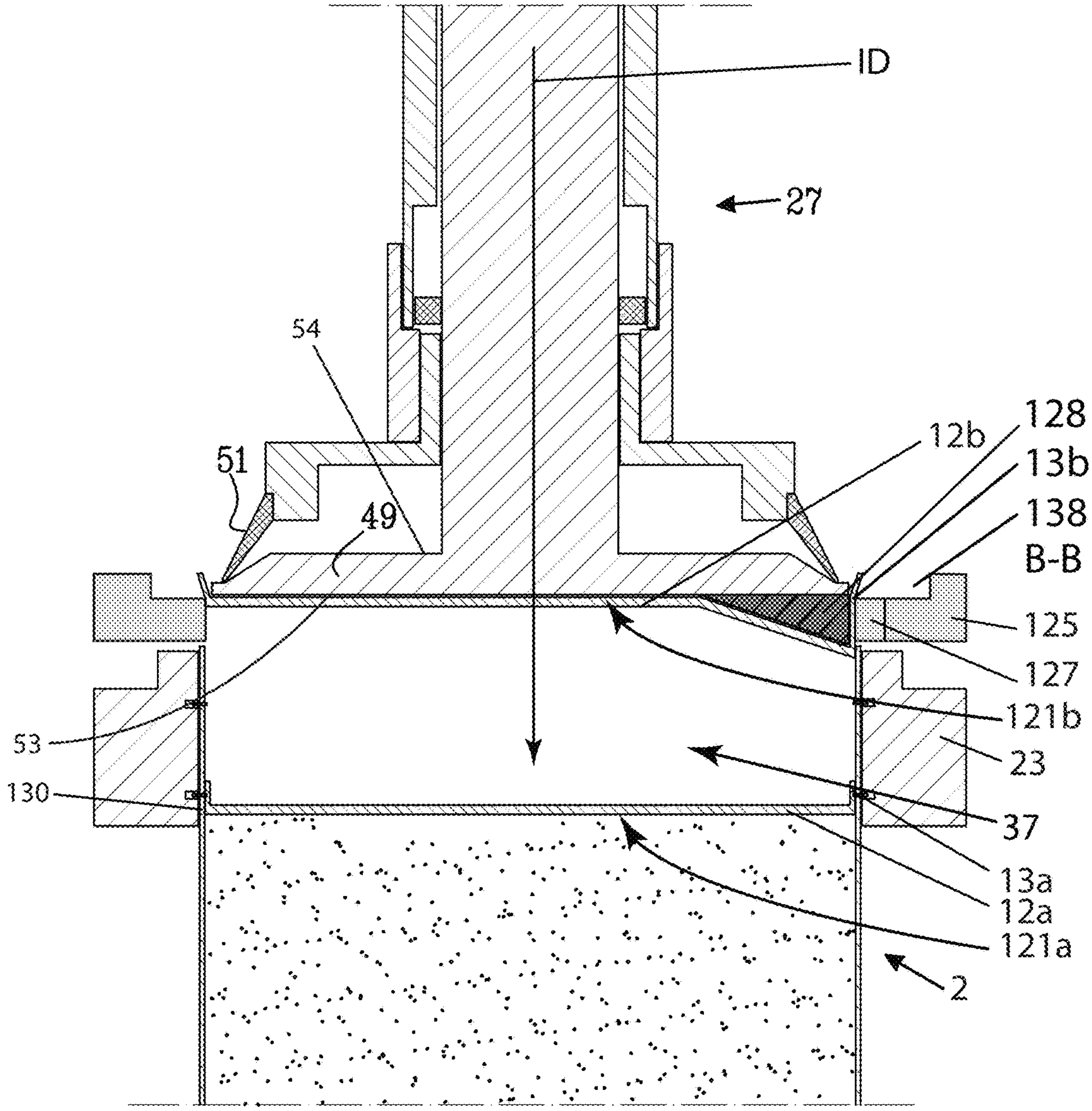
FIG. 11 shows a schematic cross-sectional view of a second paperboard insert being pressed into a packaging container of the present disclosure.
Figure 13:
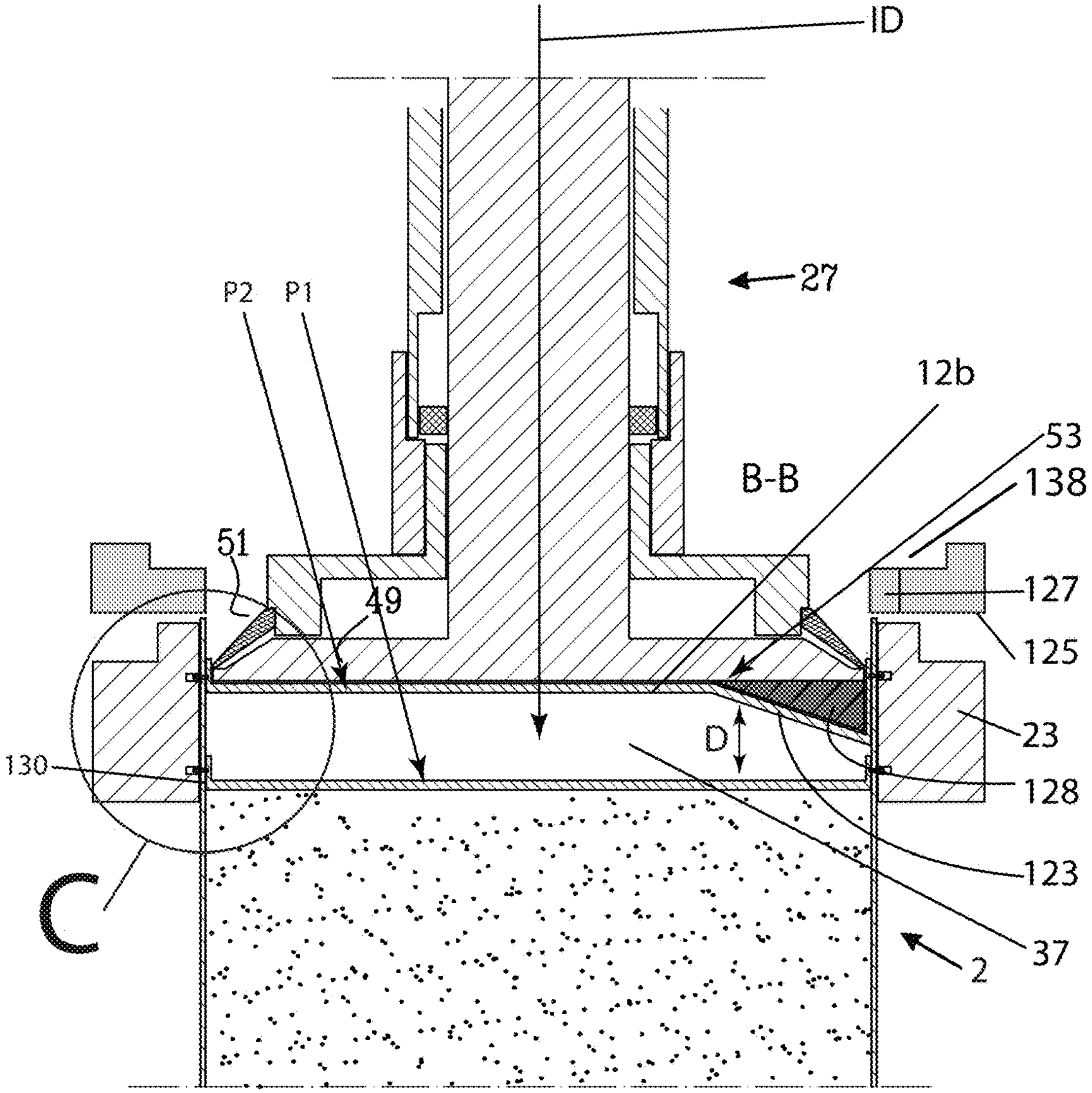
FIG. 13 shows a schematic view corresponding to the view of FIG. 12, but at a later stage of insertion of the second paperboard insert into the packaging container. A plunger is depressed to apply a pressure along the circumference of the second peripheral flange portion of the second paperboard disc, to allow for attachment of the second paperboard disc to the container body wall by welding.

As shown in FIGS. 11 and 13, step f) may be performed by forcing the second paperboard insert 12*b* into the external recess 122 using a footprint surface 53 of a press tool 27. The footprint surface 53 has a shape and size adapted to the shape and size of the first end opening 4 of the container body 2, and has a protrusion 128 for forming the recessed portion 123 of the second paperboard insert 12*b*. The protrusion 128 of the press tool 27 may be integrally formed with the footprint surface 53 of the press tool, or provided as a separate member attached to the press tool to modify the footprint surface, without departing from the disclosure.

Figure 12:
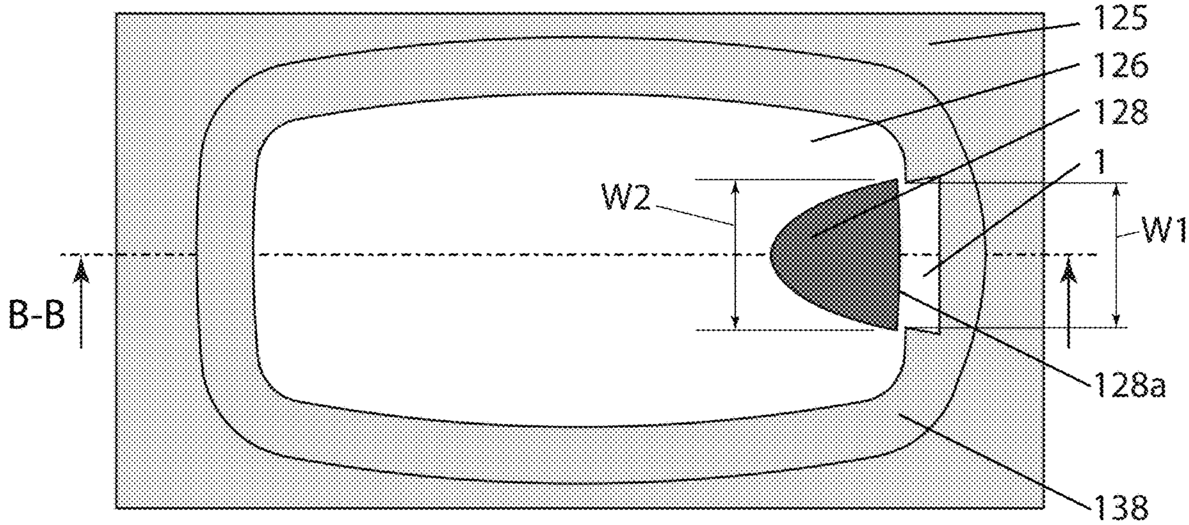
FIG. 12 shows a schematic top view of a guide plate for guiding the second paperboard insert into the packaging container shown in FIG. 11.

As shown in FIGS. 11, 12 and 13, step f) may comprises positioning a guide plate 125 adjacent the first end opening 4 of the container body 2 such that a through cavity 126 of the guide plate 125 is aligned with the first end opening 4, said through cavity 126 having a shape and size corresponding to the shape and size of the first end opening 4 of the container body 2. The second paperboard insert 12*b* is guided into the external recess 122 through the through cavity 126 of the guide plate 125 at the pressing of the second paperboard insert 12*b* into the external recess 122, wherein the second peripheral flange portion 13*b* is bent between the guide plate 125 and the press tool 27.

The guide plate 125 typically also comprises an alignment recess 138 shaped to align a paperboard blank 131*a*, 131*b* with the through cavity 126 of the guide plate 125.

The use of such a guide plate 125, protects the first end 3 of the container body 2 such that deformation of the paperboard bland occurs mainly as a result of forces acting on the paperboard blank by the guide plate and the press tool, rather than between the container body wall 7 and the press tool 27.

It should be understood that two different press tools 27 may be needed: one for the first paperboard insert 12*a*, and another for the second paperboard insert 12*b*. It can be seen that the press tool 27 used for the first paperboard insert 12*a* does not have a protrusion 128 for forming a recess, whilst the press tool 27 used for the second paperboard insert 12*b* may have such a protrusion 128 as shown in FIG. 11. If no recessed portion 123 is in the second paperboard insert 12*b*, the same press tool 27 may be used for both the first paperboard insert 12*a* and the second paperboard insert 12*b*.

Figure 10:
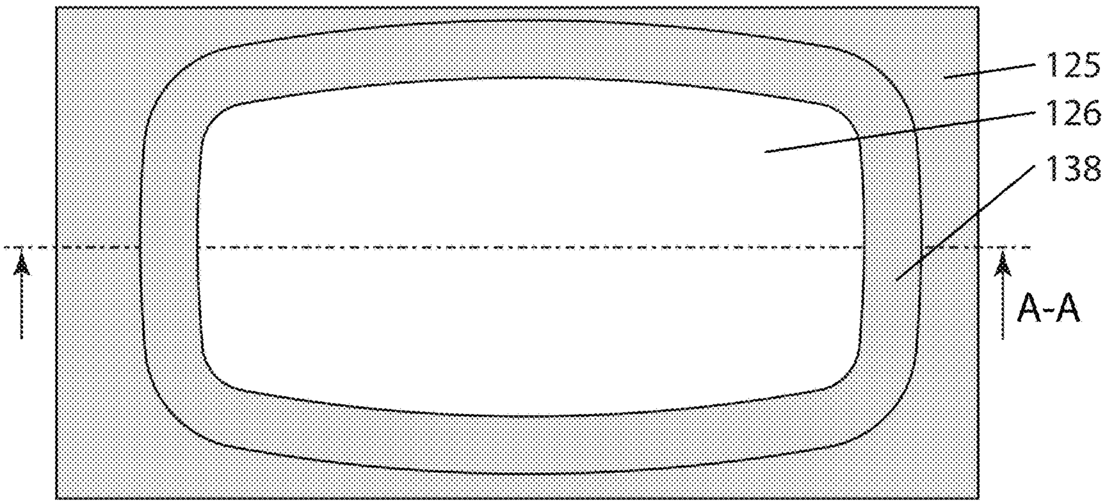
FIG. 10 shows a schematic top view of a guide plate for guiding the first paperboard insert into the packaging container shown in FIG. 9.

Similarly, as shown in FIGS. 10 and 12, two different guide plates 125 may be needed: one for the first paperboard insert 12*a* and another for the second paperboard insert 12*b*.

The through cavity 126 of the guide plate 125 used for the second paperboard insert 12*b* has a recessed portion 127 extending the through cavity 126 laterally with respect to an insertion direction ID along which the second paperboard insert 12*b* is inserted into the external recess 122. The recessed portion 127 of the through cavity 126 is positioned adjacent where the protrusion 128 of the footprint surface 53 passes through said through cavity 126.

The recessed portion 127 reduces the area/edge length of the through cavity of the guide plate 125 on which the paperboard blank slides at deformation between the press tool 27 and the guide plate 125, thus enabling increased local stress on portions of the paperboard blank such that the paperboard blank folds at intended locations as the second peripheral flange portion is folded to point away from the second central portion of the second paperboard insert 12*b*.

The recessed portion 127 of the through cavity 126 has a dovetail shape.

The dovetail shape provides relatively sharp corners at the opening of the recessed portion, thereby enabling greater control of where the material of the blank folds as it is pressed through the guide plate 125.

The protrusion 128 of the footprint surface 53 may comprise an outer surface portion 128*a* facing the container body wall 7 when inserted into the external recess 122. The outer surface portion 128*a* has a shape corresponding to the shape of an adjacent portion of the container body wall 7 when inserted into the external recess 122, wherein the width W1 of an opening of the recessed portion 127 corresponds to a width W2 of the outer surface portion 128*a* of the protrusion 128 of the footprint surface 53. In one example, the shape of the outer surface portion 128*a* is curved to correspond to the curved shape of the adjacent portion of the container body wall 7. The outer surface portion 128*a*, could have other shapes (e.g., straight) without departing from the disclosure.

The correspondence between the width of outer surface portion and the width of the opening of the recessed portion concentrates stress on the paperboard material of the blank, thereby improving control of where the material of the blank folds as it is pressed through the guide plate.

In other embodiments, the recessed portion 127 may not be needed, for example if the choice of paperboard quality used for the paperboard blanks. The recessed portion 127 may thus alternatively be omitted. In some embodiments, the recessed portion 127 may have some other suitable shape promoting a predeterminable deformation of the peripheral portion of the paperboard blanks 131*a*, 131*b*.

The press tool 27 may be configured as shown in FIGS. 9, 11, 13 and 14, and corresponds to the "positioning unit" explained in further detail in U.S. Pat. No. 11,292,625 that is incorporated by reference herein for all purposes. However, any other suitable press tool could alternatively be used instead, such as a suitably shaped piston.

Also, a retaining device 23 is used to position and support the container body 2 during insertion of the paperboard inserts 12*a*, 12*b* into the container body 2. The retaining device 23 can correspond to the retaining device explained in further detail in incorporated by reference U.S. Pat. No. 11,292,625.

The retaining device 23 thus comprises at least one through-going positioning cavity adapted to receive a portion of the container body 2.

In order to achieve the above-mentioned attaching of the peripheral flange portions 12*a*, 13*b* of the paperboard insert to the container body 2, the retaining device 23 comprises a welding unit, preferably arranged around the positioning cavity. The welding unit (not illustrated) is adapted to weld the paperboard inserts 12*a*, 12*b* to the container body 2, e.g., by the welding unit comprising a coil extending around the positioning cavity. As the press tool 27 is expandable in a radial direction of the positioning cavity as set out herein, the respective paperboard insert 12*a*, 12*b* can be pressed against the welding unit. Any suitable welding technique may be used, such as ultrasonic welding or high frequency welding, with high frequency welding being preferred.

As an alternative or a complement to welding, an adhesive may be applied to the paperboard insert before attaching it to the container body 2.

The press tool 27 comprises a base plate 49 comprising or being constituted by a rigid material such as metal or a composite material, and a plunger skirt 51 comprising a resiliently deformable material, e.g., rubber or plastics. The plunger skirt 51 is located on top of the base plate 49, such that it at least partly covers an upper surface 54 of the base plate 49 which upper surface 54 is opposite a lower footprint surface 53 of the base plate 49.

The footprint surface 53 is configured to face towards the paperboard insert during application of the paperboard insert in the container body 2. It is to be understood that the footprint surface 53 may have any other suitable shape adapted to the cross-sectional shape of the packaging container 1 being produced.

The plunger skirt 51 is transformable between an unexpanded state, see FIG. 11, and an expanded state, see FIG. 13, by relative movement in relation to the base plate 49.

In the unexpanded state of the plunger skirt 51, the shape of the outer contour of the plunger skirt 51 corresponds to that of the base plate 49. Hence, in the unexpanded state, the plunger skirt 51 has the same substantially footprint as the base plate 49.

In the expanded state, see FIG. 13, a cross-sectional area (footprint) delimited by the outer circumference of the plunger skirt 51 is larger than in the unexpanded state of the plunger skirt 51.

The second end opening 6 of the container body 2 can be closed in a similar manner as the first end opening 4.

The paperboard blanks 131*a*, 131*b* could be pre-formed in a separate method step using any suitable pre-forming device to shape the paperboard blank 131*a*, 131*b* into a first paperboard insert 12*a*, 12*b* and enable the first paperboard insert 12*a*, 12*b* to easier fit into the first end opening 4, said first paperboard insert 12*a*, 12*b* thus obtaining much of its desired shape and any creases or crease lines before insertion into the container body 2.

The invention claimed is:

1. A method of forming a paperboard packaging container for bulk solids, the method comprising:

obtaining a body blank having a first side edge and a second side edge, the body blank being made of a laminate sheet material comprising a carton substrate layer;

forming a container body from the body blank, the container body defines an inner compartment, the container body comprises a container body wall having an inner surface facing the inner compartment, an outer surface facing away from the inner compartment, and a weakened portion extending along at least a portion of the circumference of the container body, the container body comprises a first end with a first end opening and a second end opposite the first end having a second end opening;

closing the first end opening by pressing a first paperboard insert into the first end opening to a first predetermined position relative to the container body and forming an external recess, the first paperboard insert comprising a first central portion covering the first end opening and a first peripheral flange portion, at the first predetermined position of the first paperboard insert;

attaching the first peripheral flange portion of the first paperboard insert to the container body wall at a first attachment portion of the container body, the weakened portion in the container body wall is between the first attachment portion and the second end of the container body;

pressing a second paperboard insert into the external recess through the first end opening to a second predetermined position relative to the container body, the second paperboard insert comprising a second central portion covering the first end opening and a second peripheral flange portion; and attaching the second peripheral flange portion of the second paperboard insert to the container body wall.

2. The method according to claim 1, wherein the first peripheral flange portion extends away from the first central portion towards the first end opening of the container and the second peripheral flange portion extends away from the second central portion towards the first end opening of the container body.

3. The method according to claim 1, further comprising deforming the second central portion of the second paperboard insert prior to attaching the second peripheral flange portion to the container body wall, such that a recessed portion of the second paperboard insert is formed adjacent the second peripheral flange.

4. The method according to claim 3, wherein the recessed portion is shaped such that a distance between the second central portion of the second paperboard insert and the first central portion of the first paperboard insert is reduced at the recessed portion.

5. The method according to claim 4, wherein pressing the second paperboard insert into the external recess comprises positioning the second paperboard insert into the external recess using a footprint surface of a press tool, the footprint surface having a shape and size adapted to the shape and size of the first end opening of the container body, and having a protrusion for forming the recessed portion of the second paperboard insert.

6. The method according to claim 5, wherein pressing the second paperboard insert into the external recess comprises positioning a guide plate adjacent the first end opening of the container body such that a through cavity of the guide plate is aligned with the first end opening, the through cavity having a shape and size corresponding to the shape and size of the first end opening of the container body, guiding the second paperboard insert into the external recess through the through cavity of the guide plate, and forming the second peripheral flange portion between the guide plate and the press tool.

7. The method according to claim 6, wherein the through cavity of the guide plate has a recessed portion extending the through cavity laterally with respect to an insertion direction along which the second paperboard insert is inserted into the external recess, the recessed portion of the through cavity is positioned adjacent the protrusion of the footprint surface as the press tool passes through the through cavity.

8. The method according to claim 6, wherein the recessed portion of the through cavity has a dovetail shape.

9. The method according to claim 8, wherein the protrusion of the footprint surface comprises an outer surface portion facing the container body wall when the press tool is inserted into the external recess, the outer surface portion having a shape corresponding to the shape of an adjacent portion of the container body wall.

10. The method according to claim 9, wherein the width of an opening of the recessed portion corresponds to a width of the outer surface portion of the protrusion of the footprint surface.

11. The method according to claim 1, wherein the second predetermined position is above the first predetermined position.

12. The method according to claim 1, further comprising closing the second end opening at the second end.

13. A paperboard packaging container for bulk solids, the container comprising a container body defining an inner compartment, the container body comprising a container body wall made of a laminate sheet material comprising a carton substrate layer, and the container body comprising a first end with a first end opening and a second end opposite the first end having a second end opening, the container body wall having an inner surface facing the inner compartment and an outer surface facing away from the inner compartment, a first paperboard insert closing the first end opening, the first paperboard insert comprising a first central portion covering the first end opening and a first peripheral flange portion, the first paperboard insert being located in the container body and forming an external recess, the first peripheral flange portion is attached to the inner surface of the container body wall at a first attachment portion of the container body, the container body has a weakened portion extending along at least a portion of the circumference of the container body, the weakened portion is between the first attachment portion and the second end of the container body, the packaging container further comprising a second paperboard insert positioned in the external recess and covering the first end opening, the second paperboard insert comprising a second central portion and a second peripheral flange portion attached to the container body wall.

14. The paperboard packaging container according to claim 13, wherein the first peripheral flange portion extends away from the first central portion towards the first end opening of the container and the second peripheral flange portion extends away from the second central portion towards the first end opening of the container body.

15. The paperboard packaging container according to claim 13, wherein the second central portion of the second paperboard insert comprises a recessed portion adjacent the container body wall.

16. The paperboard packaging container according to claim 15, wherein the recessed portion is shaped such that a distance between the second central portion of the second paperboard insert and the first central portion of the first paperboard insert is reduced at the recessed portion.

17. The paperboard packaging container according to claim 15, wherein the second paperboard insert is formed from a paperboard blank, wherein the paperboard blank comprises a central portion having a shape and size corresponding to the shape and size of the first end opening of the container body, and a peripheral portion surrounding the central portion, wherein the peripheral portion of the paperboard blank is enlarged adjacent a portion of the paperboard blank where the recessed portion is formed.

18. The paperboard packaging container according to claim 13, wherein the second central portion of the second paperboard insert comprises a grip opening.

19. The paperboard packaging container according to claim 18, further comprising a cover covering the grip opening.

20. The paperboard packaging container according to claim 19, wherein the cover is a portion of the second central portion integrally formed with the second paperboard insert and at least partly surrounded by a perforation of the second central portion.

21. The paperboard packaging container according to claim 19, wherein the cover is hingedly connected to the second paperboard insert by a hinge.

22. The paperboard packaging container according to claim 13, wherein the first paperboard insert is positioned in the container body at a first position, the second paperboard insert is positioned in the container body at a second position, the second position is above the first position.

23. The paperboard packaging container according to claim 13, wherein the first paperboard insert and the second paperboard insert comprises a lid.

24. The paperboard packaging container according to claim 23, wherein the lid comprises an upper portion of the container body that is separable from the container body at the weakened portion.

25. The paperboard packaging container according to claim 24, wherein the lid is at least partially removable from the container body at the weakened portion.

* * * * *